US007986460B2

(12) United States Patent
Shiraishi

(10) Patent No.: US 7,986,460 B2
(45) Date of Patent: Jul. 26, 2011

(54) ERECT LIFE-SIZE LENS ARRAY

(75) Inventor: Takashi Shiraishi, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 5 days.

(21) Appl. No.: 12/685,437

(22) Filed: Jan. 11, 2010

(65) Prior Publication Data

US 2010/0202058 A1 Aug. 12, 2010

Related U.S. Application Data

(60) Provisional application No. 61/145,072, filed on Jan. 15, 2009.

(51) Int. Cl.
*G02B 27/10* (2006.01)

(52) U.S. Cl. .................................................... 359/619

(58) Field of Classification Search .................. 359/619, 359/620, 621, 622, 623, 624, 625, 626
See application file for complete search history.

(56) References Cited

U.S. PATENT DOCUMENTS 5,689,315 A * 11/1997 Fushimi et al. .................. 349/5
6,396,636 B2 * 5/2002 Sawaki et al. ................. 359/624

FOREIGN PATENT DOCUMENTS

JP 2006-14081 1/2006

* cited by examiner

*Primary Examiner* — Ricky L Mack
*Assistant Examiner* — Tuyen Tra
(74) *Attorney, Agent, or Firm* — Patterson & Sheridan, LLP

(57) ABSTRACT

An erect life-size lens array having a deep focal depth is realized. The erect life-size lens array includes a first lens array, a second lens array, a third lens array, a first aperture and a second aperture, wherein when a distance between a second principal plane of the second lens and a first principal plane of the third lens is $\xi_1$, a distance between a second principal plane of the third lens and a design image surface is $\xi_2$, a radius of a circular hole of the aperture is $r_a$, and a defocus amount is $\xi_3$, the erect life-size lens array is for causing an MTF at a spatial frequency $\nu$ to become $MTF_{target}$ or more and satisfies $$(J_1(2\pi\cdot r_a\cdot((1/\xi_1)+(1/\xi_2))\cdot\nu\cdot\xi_3))/(\pi\cdot r_a\cdot((1/\xi_1)+(1/\xi_2))\cdot\nu\cdot\xi_3)\geqq MTF_{target},$$

where $J_1$ is a first type first-order Bessel function.

20 Claims, 28 Drawing Sheets

LIGHT BEAM TRAVELING DIRECTION

| tc183aeae_th12_45deg | | | | |
|---|---|---|---|---|
| SRF | RADIUS | THICKNESS | APERTURE RADIUS | GLASS |
| OBJ | 0 | 1 | 0.693 | AIR |
| 1 | 0 | 6.246 | 2.200 | AIR |
| 2 | 0 | 0 | 2.200 | AIR |
| 3 | 0 | 0 | 2.898 | AIR |
| 4 | 0 | 0.499 | 0.165 | ARTON45DEG |
| 5 | −0.578238500070 | 1.152 | 0.165 | AIR |
| 6 | 0.583308227597 | 0.499 | 0.165 | ARTON45DEG |
| 7 | −0.583308227597 | 1.152 | 0.165 | AIR |
| 8 | 0.578238500070 | 0.499 | 0.165 | ARTON45DEG |
| 9 | 0 | 6.246 | 2.959 | AIR |
| 10 | 0 | 1 | 0.693 | |

FIG.9

*CONIC AND POLYNOMIAL ASPHERIC DATA

| SRF | CC | AD | AE | AF | AG |
|---|---|---|---|---|---|
| 5 | -0.070900707425 | 1.160973547454 | 0.019759516175 | 0 | 0 |
| 6 | -0.003307910559 | -1.409197432027 | 0.034956713118 | 0 | 0 |
| 7 | -0.003307910559 | 1.409197432027 | -0.034956713118 | 0 | 0 |
| 8 | -0.070900707425 | -1.160973547454 | -0.019759516175 | 0 | 0 |

FIG.10

$$z = \frac{cvr^2}{1+\sqrt{1-cv^2(cc+1)r^2}} + adr^4 + aer^6 + afr^8 + agr^{10}$$

where $$r = \sqrt{x^2 + y^2}$$

FIG.13

| tc179aeae_th18_45deg | | | | |
|---|---|---|---|---|
| SRF | RADIUS | THICKNESS | APERTURE RADIUS | GLASS |
| OBJ | 0 | 1 | 1.386 | AIR |
| 1 | 0 | 5.433 | 2.200 | AIR |
| 2 | 0 | 0 | 2.200 | AIR |
| 3 | 0 | 0 | 2.573 | AIR |
| 4 | 0 | 0.499 | 0.165 | ARTON45DEG |
| 5 | −0.764945903347 | 1.763 | 0.165 | AIR |
| 6 | 0.893062972294 | 0.499 | 0.165 | ARTON45DEG |
| 7 | −0.893062972294 | 1.763 | 0.165 | AIR |
| 8 | 0.764945903347 | 0.499 | 0.165 | ARTON45DEG |
| 9 | 0 | 5.433 | 2.709 | AIR |
| 10 | 0 | 1 | 1.386 | |

FIG.14

*CONIC AND POLYNOMIAL ASPHERIC DATA

| SRF | CC | AD | AE | AF | AG |
|---|---|---|---|---|---|
| 5 | -0.035759456222 | 0.463545222361 | 0.079962901492 | 0 | 0 |
| 6 | -1.961917625271 | -0.052043100932 | 0.052846179958 | 0 | 0 |
| 7 | -1.961917625271 | 0.052043100932 | -0.052846179958 | 0 | 0 |
| 8 | -0.035759456222 | -0.463545222361 | -0.079962901492 | 0 | 0 |

FIG.18

*LENS DATA
p010tc173aeae_th16_opt2

| SRF | RADIUS | THICKNESS | APERTURE RADIUS | GLASS |
|---|---|---|---|---|
| OBJ | 0 | 1 | 0.69282 | AIR |
| 1 | 0 | 5.30901499 | - | AIR |
| 2 | 0 | 0 | - | AIR |
| 3 | 0 | 0 | - | AIR |
| 4 | 0 | 0.5 | 0.0825 | ARTON45DEG |
| 5 | -0.709670752 | 1.59098501 | 0.0825 | AIR |
| 6 | 0.807178908 | 0.5 | 0.0825 | ARTON45DEG |
| 7 | -0.807178908 | 1.59098501 | 0.0825 | AIR |
| 8 | 0.709670752 | 0.5 | 0.0825 | ARTON45DEG |
| 9 | 0 | 4.68197002 | 0.0825 | AIR |
| 10 | 0 | 5.30901499 | - | AIR |
| IMS | 0 | 1 | - | |

FIG.19

*CONIC AND POLYNOMIAL ASPHERIC DATA

A

| SRF | CC | AD | AE | AF | AG |
|---|---|---|---|---|---|
| 5 | -0.063612919 | 0.380464979 | -0.077121858 | 0 | 0 |
| 6 | -17.13297653 | 3.346088319 | -25.44040411 | 0 | 0 |
| 7 | -17.13297653 | -3.346088319 | 25.44040411 | 0 | 0 |
| 8 | -0.063612919 | -0.380464979 | 0.077121858 | 0 | 0 |

ERECT LIFE-SIZE LENS ARRAY

CROSS-REFERENCE TO RELATED APPLICATION

This application is based upon and claims the benefit of priority from: U.S. provisional application 61/145,072, filed on Jan. 15, 2009, the entire contents of each of which are incorporated herein by reference.

TECHNICAL FIELD

The present invention relates to a technique to realize a long-focal-depth erect life-size lens array.

BACKGROUND

Hitherto, a specific technique to realize a long-focal-depth erect life-size lens array is not disclosed.

JP-A-2006-14081 is known as disclosing a technique relating to a long-focal-depth erect life-size lens array.

However, JP-A-2006-14081 merely discloses specifications required for the lens array, and does not disclose a specific technique to realize the long-focal-depth erect life-size lens array.

SUMMARY

In order to solve the problem, according to an aspect of the invention, an erect life-size lens array includes a first lens array in which plural first lenses each having a convex exit surface are arranged in a direction orthogonal to an optical axis, a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident, a third lens array in which plural third lenses each having a convex incidence surface are arranged to correspond to the plural first lenses in the direction orthogonal to the optical axis, a first aperture which includes plural circular holes corresponding to the plural first lenses and the plural second lenses and is disposed between the first lens array and the second lens array, and a second aperture which includes plural circular holes corresponding to the plural second lenses and the plural third lenses and is disposed between the second lens array and the third lens array, wherein when a distance between a second principal plane of the second lens and a first principal plane of the third lens is $\xi_1$, a distance between a second principal plane of the third lens and a design image surface is $\xi_2$, a radius of the circular hole of the aperture is $r_a$, and a defocus amount is $\xi_3$, the erect life-size lens array is for causing an MTF at a spatial frequency (line-pair/mm) $\nu$ to become $MTF_{target}$ more, and satisfies $(J_1(2\pi \cdot r_a \cdot ((1/\xi_1)+(1/\xi_2)) \cdot \nu \cdot \xi_3))/(\pi \cdot r_a \cdot ((1/\xi_1)+(1/\xi_2)) \cdot \nu \cdot \xi_3) \geqq MTF_{target}$ (where, $J_1$ is a first type first-order Bessel function).

According to another aspect of the invention, an erect life-size lens array includes a first lens array in which plural first lenses each having a plane incidence surface and a convex exit surface are arranged in a direction orthogonal to an optical axis, a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident, a third lens array in which plural third lenses each having a convex incidence surface and a plane exit surface are arranged to correspond to the plural first lenses in the direction orthogonal to the optical axis, a first aperture which includes plural circular holes corresponding to the plural first lenses and the plural second lenses and is disposed between the first lens array and the second lens array, and a second aperture which includes plural circular holes corresponding to the plural second lenses and the plural third lenses and is disposed between the second lens array and the third lens array, wherein when a distance between a second principal plane of the second lens and a first principal plane of the third lens is $\xi_1$, a distance between a second principal plane of the third lens and a design image surface is $\xi_2$, and a radius of the circular hole of the aperture is $r_a$, the erect life-size lens array satisfies $r_a((1/\xi_1)+(1/\xi_2)) \leqq 0.218$.

According to another aspect of the invention, an erect life-size lens array includes a first lens array in which plural first lenses each having a plane incidence surface and a convex exit surface are arranged in a direction orthogonal to an optical axis, a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident, a third lens array in which plural third lenses each having a convex incidence surface and a plane exit surface are arranged to correspond to the plural first lenses in the direction orthogonal to the optical axis, a first aperture which includes plural circular holes corresponding to the plural first lenses and the plural second lenses and is disposed between the first lens array and the second lens array, and a second aperture which includes plural circular holes corresponding to the plural second lenses and the plural third lenses and is disposed between the second lens array and the third lens array, wherein when a distance between a second principal plane of the second lens and a first principal plane of the third lens is $\xi_1$, a distance between a second principal plane of the third lens and a design image surface is $\xi_2$, and a radius of the circular hole of the aperture is $r_a$, the erect life-size lens array satisfies $r_a((1/\xi_1)+(1/\xi_2)) \leqq 0.123$.

According to another aspect of the invention, an erect life-size lens array includes a first lens array in which plural first lenses each having a plane incidence surface and a convex exit surface are arranged in a direction orthogonal to an optical axis, a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident, a third lens array in which plural third lenses each having a convex incidence surface and a plane exit surface are arranged to correspond to the plural first lenses in the direction orthogonal to the optical axis, a first aperture which includes plural circular holes corresponding to the plural first lenses and the plural second lenses and is disposed between the first lens array and the second lens array, and a second aperture which includes plural circular holes corresponding to the plural second lenses and the plural third lenses and is disposed between the second lens array and the third lens array, wherein when a distance between a second principal plane of the second lens and a first principal plane of the third lens is $\xi_1$, a distance between a second principal plane of the third lens and a design image surface is $\xi_2$, and a radius of the circular hole of the aperture is $r_a$, the erect life-size lens array satisfies $r_a((1/\xi_1)+(1/\xi_2)) \leqq 0.0908$.

According to another aspect of the invention, an erect life-size lens array includes a first lens array in which plural first lenses each having a plane incidence surface and a convex exit surface are arranged in a direction orthogonal to an optical axis, a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident, a third lens array in which plural third lenses each having a convex incidence surface and a plane exit surface are arranged to correspond to the plural first lenses in the direction orthogonal to the optical axis, a first aperture which includes plural circular holes corresponding to the plural first lenses and the plural second lenses and is disposed between the first lens array and the second lens array, and a second aperture which includes plural circular holes corresponding to the plural second lenses and the plural third lenses and is disposed between the second lens array and the third lens array, wherein when a distance between a second principal plane of the second lens and a first principal plane of the third lens is $\xi_1$, a distance between a second principal plane of the third lens and a design image surface is $\xi_2$, and a radius of the circular hole of the aperture is $r_a$, the erect life-size lens array satisfies $r_a((1/\xi_1)+(1/\xi_2))\leqq 0.0604$.

DESCRIPTION OF THE DRAWINGS

FIG. 8 is a view for explaining the basic arrangement of respective lenses in a first example.

FIG. 9 is a view showing aspheric coefficients of the respective lenses in the first example.

FIG. 10 is a view for explaining an aspherical expression.

FIG. 13 is a view for explaining the basic arrangement of respective lenses in a second example.

FIG. 14 is a view showing aspheric coefficients of the respective lenses in the second example.

FIG. 18 is a view for explaining the basic arrangement of respective lenses in a third example.

FIG. 19 is a view showing aspheric coefficients of the respective lenses in the third example.

DETAILED DESCRIPTION

Hereinafter, an embodiment will be described with reference to the drawings.

Figure 1:
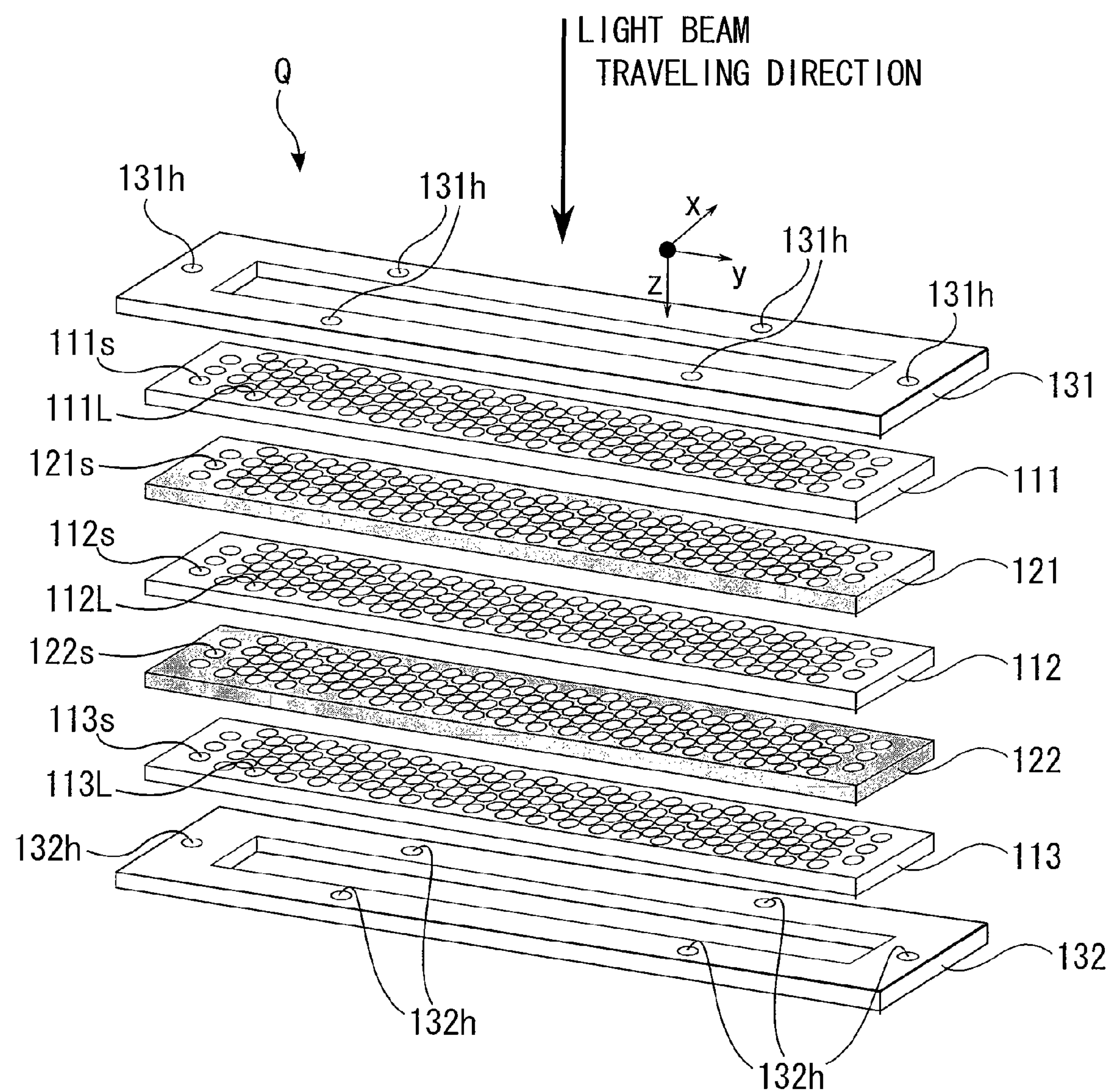
FIG. 1 is an exploded perspective view showing the whole structure of a long-focal-depth erect life-size lens array of an embodiment of the invention.
Figure 2:
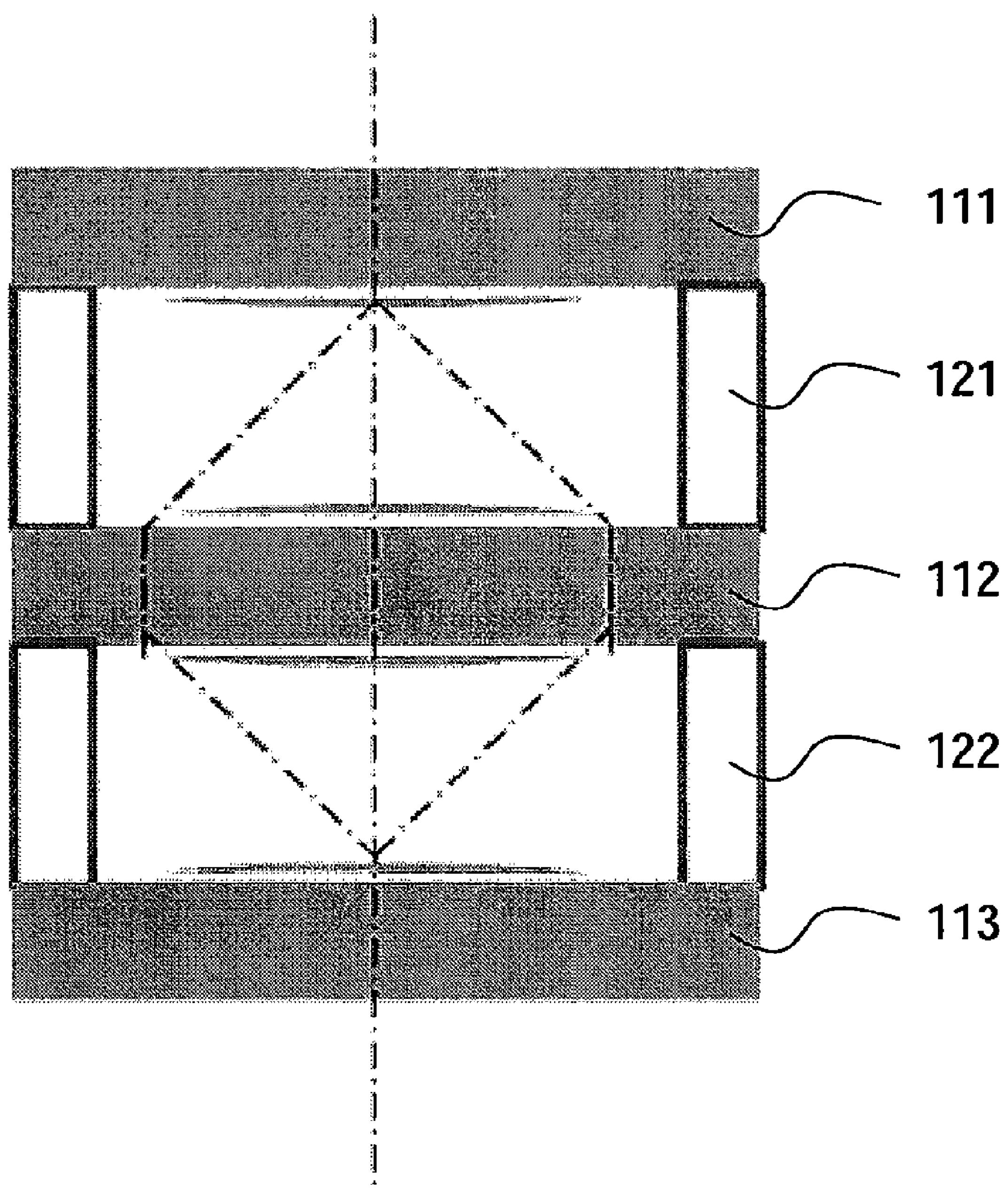
FIG. 2 is a sectional view showing extracted one of lens arrays used for the long-focal-depth erect life-size lens array of the embodiment of the invention.
Figure 3:
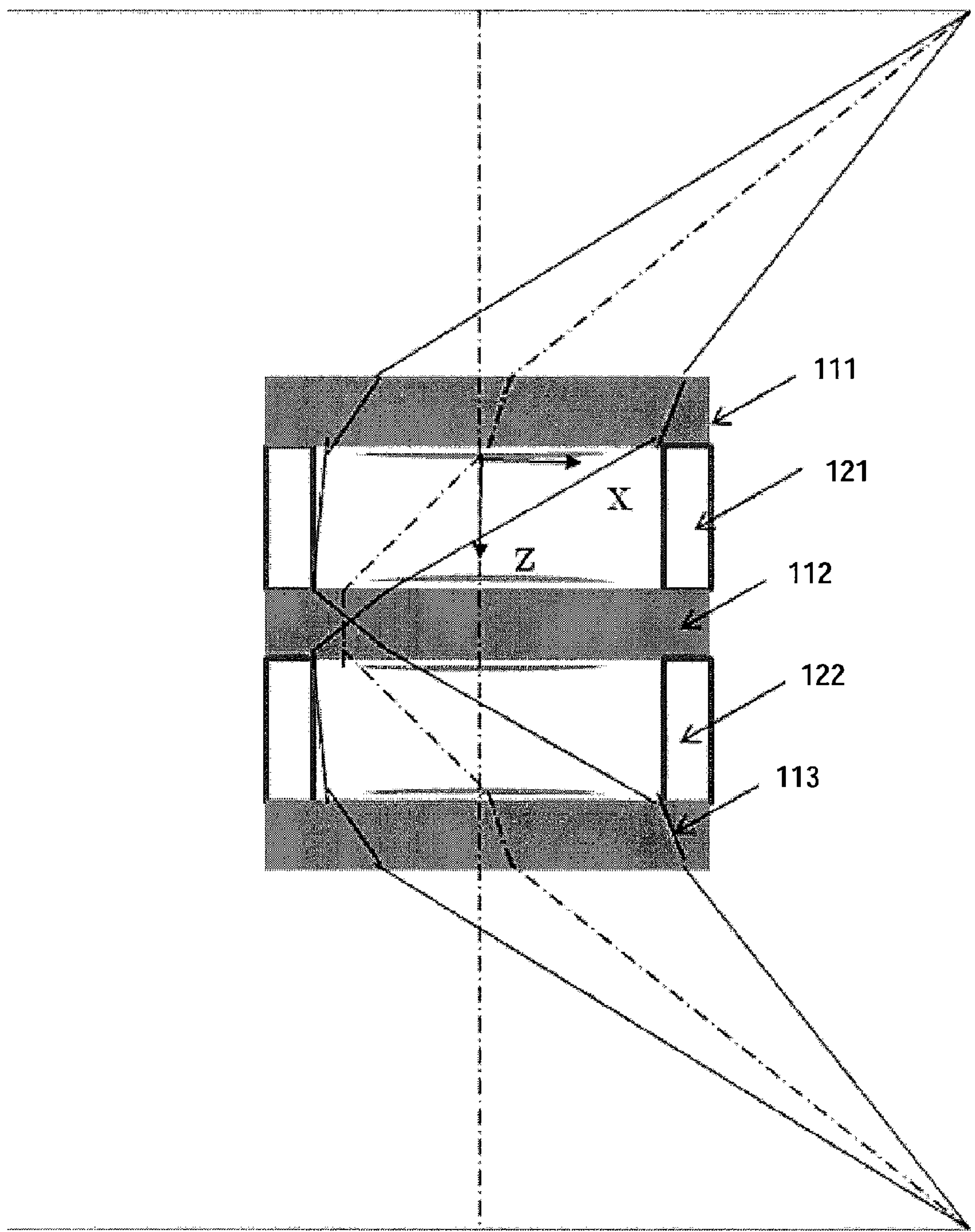
FIG. 3 is a sectional view showing extracted one of the lens arrays used for the long-focal-depth erect life-size lens array of the embodiment of the invention.

FIG. 1 is an exploded perspective view showing the whole structure of a long-focal-depth erect life-size lens array Q of the embodiment of the invention. FIG. 2 and FIG. 3 are sectional views showing extracted one of lens arrays used for the long-focal-depth erect life-size lens array Q of the embodiment of the invention. The erect life-size lens array Q of the embodiment is adopted for, for example, a scanning optical system of a scanner.

As shown in FIG. 1, the erect life-size lens array Q of the embodiment of the invention includes a press plate 131, a first lens array 111, an aperture 121, a second lens array 112, an aperture 122, a third lens array 113, and a press plate 132. The above respective components constituting the erect life-size lens array Q of the embodiment are arranged in the order of the press plate 131, the first lens array 111, the aperture 121, the second lens array 112, the aperture 122, the third lens array 113 and the press plate 132 in the traveling direction of a light beam.

The first lens array 111, the aperture 121, the second lens array 112, the aperture 122, and the third lens array 113 are mutually fixed by bolts or screws inserted in plural screwed holes 131*h* for positioning and plural holes 132*h* so as to be sandwiched between the press plate 131 and the press plate 132.

Besides, projections (for example, convex lens shape) 111*s*, 112*s* and 113*s* are formed on the surfaces, opposite to the apertures, of the first lens array 111, the second lens array 112 and the third lens array 113 at positions corresponding to positioning holes 121*s* and 122*s* formed on the surfaces, opposite to the respective lens arrays, of the aperture 121 and the aperture 122.

When the first lens array 111, the aperture 121, the second lens array 112, the aperture 122, and the third lens array 113 are sandwiched between the press plates 131 and 132, they are sandwiched in a state where the projections 111*s*, 112*s* and 113*s* on these lens arrays are fitted in the holes 121*s* and 122*s* of the respective apertures, so that positioning of the relative positional relation, in the direction orthogonal to the optical axis, of the first lens array 111, the aperture 121, the second lens array 112, the aperture 122 and the third lens array 113 can be performed. As stated above, the positioning of lenses and the apertures is realized by the parts having shapes equivalent to the lenses, so that the parts used for the positioning can be molded simultaneously with the molding of the lens arrays. This can contribute to improvement in relative positioning accuracy of the lenses and the parts used for positioning, and reduction in manufacture cost.

Incidentally, here, although the structure is illustrated in which the holes are formed on the aperture side and the projections are formed on the lens array side, no limitation is made to this. The projections may be formed on the aperture side, and the holes may be formed on the lens array side. Besides, it is not always necessary that the parts in which the projections are fitted are the holes, and concave parts (for example, concave lens shape) may be adopted.

Besides, in this embodiment, the incidence surface of each lens constituting the first lens array 111 and the exit surface of each lens constituting the third lens array 113 are formed to be plane. By adopting the structure as stated above, in the first lens array and the third lens array, it does not occur that after a light beam is refracted at the lens surface by the surface having power, the beam reaches an adjacent lens and becomes stray light.

Since the incidence surface of the first lens array does not have power, the light beam incident on the first lens array first reaches the surface having power when it reaches the exit surface. Since the exit surface of the third lens does not have power, after being refracted at the incidence surface by the surface having power, the beam does not enter the adjacent lens having power.

Incidentally, the reason why both the incidence surface of the first lens and the exit surface of the third lens are plane is as described below.

(1) In general, when a life-size lens system is optically designed, it is preferable that symmetrical lens arrangement is performed in the optical axis direction.

(2) When a manufacture error occurs in the lens surfaces of the first lens, the second lens and the third lens, and when the exit surface of the third lens to determine the final image formation position of the light beam has power, there is a fear that an image is formed at a position much deviating from the intended image formation position.

(3) When the first lens and the third lens are made to have symmetrical shapes, a mold used for manufacture of a lens can be used in common for these lenses, and this can contribute to great reduction in manufacture cost.

That is, with respect to the lens array, it is sufficient if a portion from the exit surface of the first lens to the incidence surface of the third lens is considered, and it is sufficient if a light beam is not incident on an adjacent array therebetween.

That is, according to the erect life-size lens array Q of the embodiment, the stray light is not generated in the first lens array 111 and the third lens array 113.

The aperture 121 and the aperture 122 having cylindrical holes are disposed between the first lens 111L and the second lens 112L and between the second lens 112L and the third lens 113L, and by this, the stray light does not enter the optical path of an adjacent lens array.

According to the structure of the embodiment, since the light beam whose incident angle is controlled by the first lens 111L is incident on the second lens 112L, the stray light is not incident on the exit surface of the adjacent lens. Besides, even if the light emitted from the exit surface of the second lens 112L travels to the adjacent third lens 113L corresponding to the second lens 112L, the generation of the stray light can be prevented by the second aperture 122 between the second lens 112L and the third lens 113L.

The front ends of the first lens array 111 and the third lens array 113 (since the incidence surface side of the first lens 111L is plane, the front end of the exit surface corresponds to the rear side principal point, while since the exit surface side of the third lens 113L is plane, the front end of the incidence surface corresponds to the front side principal point) are placed in conjugate relation to each other by the second lens array 112. As a result, even if an object point moves to an end of an effective area, it is possible to prevent the light beam from being eclipsed by the aperture plate. Thus, even if the object point moves to the end, the light amount is not decreased, and the change in light amount can be suppressed.

Besides, since a loss is small, the whole light amount becomes maximum.

The exit surface of the first lens 111L has such power that the object surface and the first (front side) principal point of the second lens 112L become conjugate to each other, and the incidence surface of the third lens 113L has such power that the second (rear side) principal point of the second lens 112L and the image surface become conjugate to each other.

Figure 4:
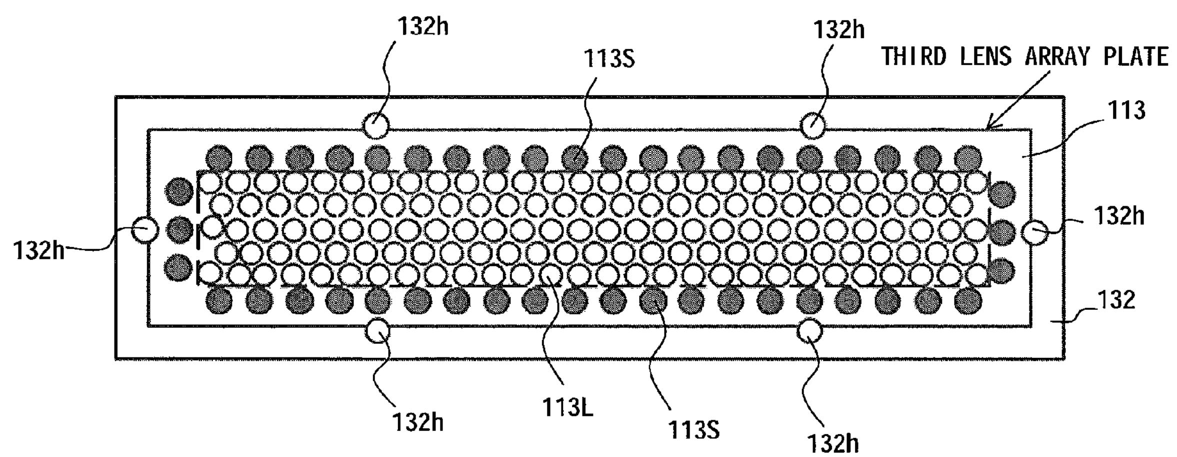
FIG. 4 is a plan view showing a state where a third lens array plate and a press plate are combined.
Figure 5:
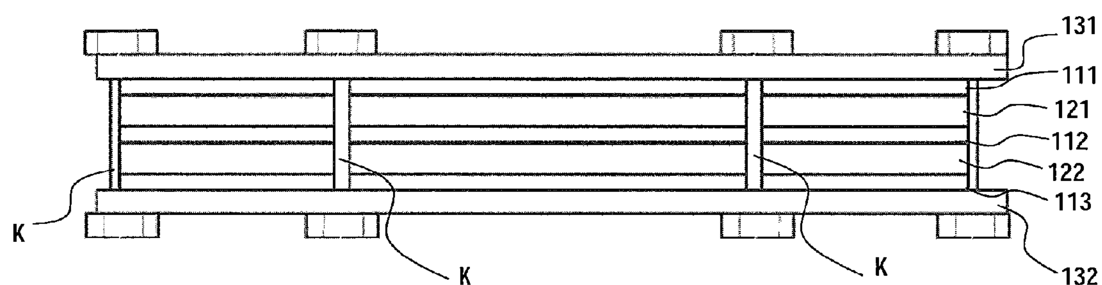
FIG. 5 is a side view showing an assembly state of the long-focal-depth erect life-size lens array of the embodiment of the invention.

FIG. 4 is a plan view showing a state in which the third lens array 113 and the press plate 132 are combined, and FIG. 5 is a side view showing an assembly state of the long-focal-depth erect life-size lens array of the embodiment of the invention.

The first press plate 131 and the second press plate 132 ensure the flatness of the erect life-size lens array of the embodiment.

The first lens array 111 is a lens array in which plural lenses each having a plane surface on the incidence surface side and a convex surface on the exit side are arranged in a direction orthogonal to an optical axis.

The first aperture 121 has a hole with a diameter almost equal to a circle obtained by projecting the line of intersection between the convex surface of the first lens 111L in the first lens array 111 and the plane portion of the first lens array 111 onto the aperture.

In the second lens array 112, plural second both-convex lenses 112L each having a radius almost equal to a circle obtained by projecting the line of intersection between the convex part of the first lens array 111 and the plane part onto the second lens array 112 are arranged in the direction orthogonal to the optical axis.

The second aperture 122 is formed to have the same shape as the first aperture 121.

The third lens array 113 is formed to have the same shape as the first lens array 111, and the shapes of the incidence surface and the exit surface are reversed in the optical axis direction.

The respective optical parts are fixed by fastening the first press plate 131 and the second press plate 132 by screwed positioning pins K (FIG. 5).

The mutual position of the lens array plate and the aperture plate is determined such that the convex part of the lens array plate around the lens and the hole of the aperture are fitted to each other, and the positioning pins are inserted in the positioning pin holes of the press plates 131 and 132.

Figure 6:
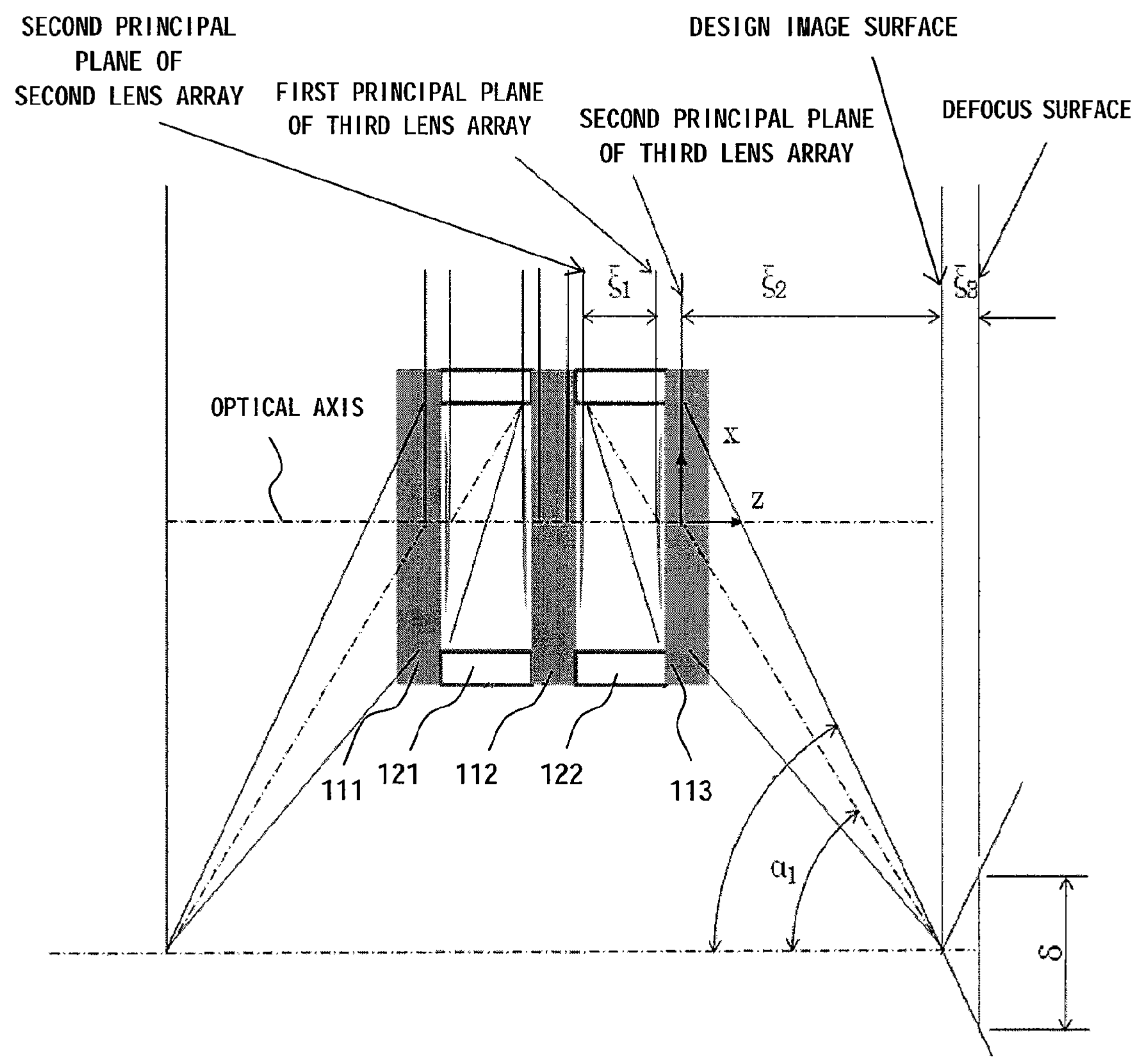
FIG. 6 is a view for explaining a method of deriving a diameter δ of a geometric optical blurred image at the time of defocus in the lens array.

FIG. 6 is a view for explaining a method of deriving a diameter $\delta$ of a geometric optical blurred image at the time of defocus in the lens array. A distance between the second principal plane of the second lens array 112 and the first principal plane of the third lens array 113 is $\xi_1$, a distance between the second principal plane of the third lens array 113 and the design image surface is $\xi_2$, and a distance between the design image surface and the image surface at the time of defocus is $\xi_3$. When the radius of the aperture is $r_a$, a light beam having the largest angle among light beams passing through the first principal point of the third lens array 113 is the light passing through the end of the aperture diameter of the second principal plane of the second lens array 112. Since the light beam passes through the principal point, the exit angle is not also changed, and is represented by $$\tan(\alpha_1)=r_a/\xi_1 \tag{1}$$

Since the outermost light when an image is formed on the image surface is the light beam separated from the principal point by the aperture radius $r_a$, the following expression is established.

$$\tan(\alpha_2)=\tan(\alpha_1)+(r_a/\xi_2)=(r_a/\xi_1)+(r_a/\xi_2)=r_a((1/\xi_1)+(1/\xi_2)) \tag{2}$$

The diameter $\delta$ of the blur image when the defocus is $\xi_3$ is represented by $$\delta=2\times\xi_3\times\tan(\alpha_2)=2\times\xi_3\times(r_a\times((1/\xi_1)+(1/\xi_2))) \tag{3}$$

When $\delta$ is larger than an airy disk, even if the influence of the diffraction is neglected and geometric-optical consideration is performed, sufficient approximation can be obtained.

When it is assumed that a point image intensity distribution function I(r) is represented by $$I(r)=1:2r\leqq\delta=0:2r>\delta \tag{4}$$

MTF($\nu$) ($\nu$ is a spatial frequency (lp/mm)) is obtained by performing Fourier transformation of I(r) and is represented by $$MTF(\nu)=\int I(r)J_0(2\pi\cdot\nu\cdot r)r\cdot dr \text{ (integration range is 0 to } \infty)=\int J_0(2\pi\cdot\nu\cdot r)r\cdot dr \text{ (integration range is 0 to } \delta/2)=((2J_1(\pi\cdot\delta\cdot\nu))/(\pi\cdot\delta\cdot\nu)) \tag{5}$$

Where, J1 is a first type first-order Bessel function. Incidentally, the MTF (modulation transfer function) corresponds to the blur degree of an image or definition.

Thus, when the defocus is $\xi_3$, the MTF is represented by $$MTF(\nu)=(2J_1(2\pi\cdot r_a\cdot((1/\xi_1)+(1/\xi_2))\cdot\nu\cdot\xi_3))/(2\pi\cdot r_a\cdot((1/\xi_1)+(1/\xi_2))\cdot\nu\cdot\xi_3)=(J_1(2\pi\cdot r_a\cdot((1/\xi_1)+(1/\xi_2))\cdot\nu\xi_3))/(\pi\cdot r_a\cdot((1/\xi_1)+(1/\xi_2))\cdot\nu\cdot\xi_3) \tag{6}$$

Although the MTF when the sensor surface is moved is calculated on the image surface side (CCD side), also when the document surface floats on the object side and defocus occurs, it is conceivable that the same MFT is obtained because of the erect life-size lens array. That is, when the defocus is $\xi_3$, in order to cause the MTF at a spatial frequency (lp/mm) $\nu$ to become $MTF_{target}$ or more, it is sufficient if the following expression is satisfied.

$$(J_1(2\pi\cdot r_a\cdot((1/\xi_1)+(1/\xi_2))\cdot\nu\cdot\xi_3))/(\pi\cdot r_a\cdot((1/\xi_1)+(1/\xi_2))\cdot\nu\cdot\xi_3)\geqq MTF_{target}$$

Figure 7:
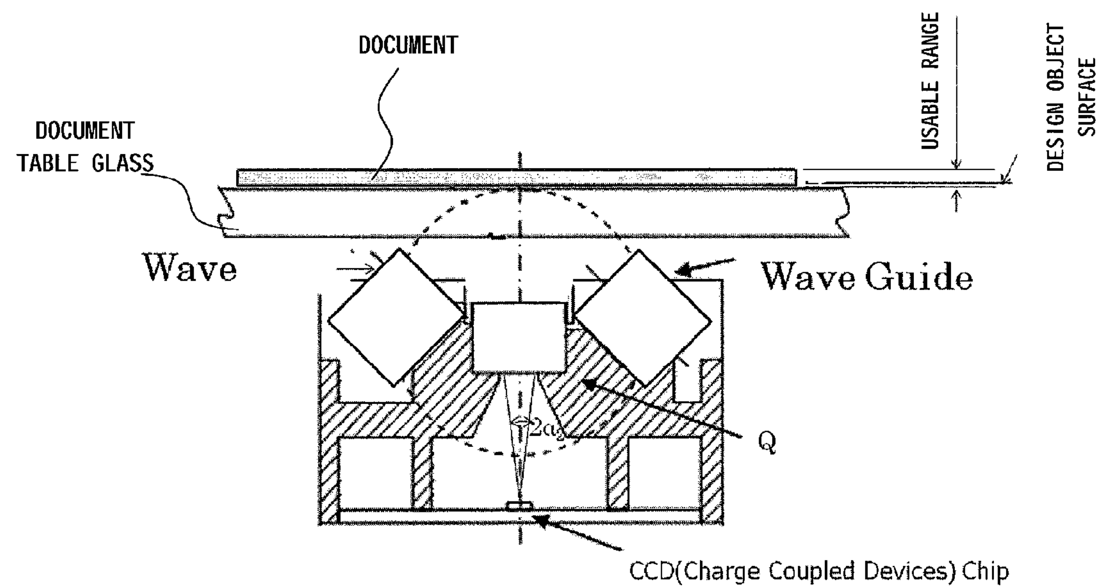
FIG. 7 is a view showing a state where the erect life-size lens array of the embodiment of the invention is applied to a scanner.

When the erect life-size lens array Q of the embodiment is applied to, for example, a scanner, the specifications as the scanner are such that an area where the MTF is 20% or more at 5 1p/mm is a usable area (see FIG. 7). It is assumed that a state where a document floats from a document surface by 0.1 mm is a standard state, and this case is made the design object surface. It is desirable that even if the document floats from the document table glass surface by up to at least 0.55 mm or 0.9 mm if possible, the MTF becomes 20% or more on the sensor. That is, it is desirable that even when a document is shifted from the design object surface by up to at least 0.45 mm or 0.8 mm if possible, the MTF is 20% or more at 5 lp/mm.

These conditions are substituted for expression (6), and when the defocus is the minimum of 0.45 mm, a condition under which the MTF becomes 20% or more at 5 lp/mm is represented by $$(J_1(2\pi\cdot r_a\cdot((1/\xi_1)+(1/\xi_2))\cdot 5\cdot 0.45))/(\pi\cdot r_a\cdot((1/\xi_1)+(1/\xi_2))\cdot 5\cdot 0.45)\geqq 0.2 \tag{7}$$

When expression (7) is solved, $$r_a\cdot((1/\xi_1)+(1/\xi_2))\geqq 0.218 \tag{8}$$

A more desirable condition under which the defocus is 0.8 mm and the MTF is 20% or more at 5 lp/mm is represented by $$(J_1(2\pi\cdot r_a\cdot((1/\xi_1)+(1/\xi_2))\cdot 5\cdot 0.8))/(\pi\cdot r_a\cdot((1/\xi_1)+(1/\xi_2))\cdot 5\cdot 0.8)\geqq 0.2 \tag{9}$$

When expression (9) is solved, the condition is represented by $$r_a\cdot((1/\xi_1)+(1/\xi_2))\leqq 0.123 \tag{10}$$

Incidentally, when regulation is performed within the range where the MTF is 10% or more at the focal depth of 6 lp/mm as disclosed in JP-A-2006-14081, in order to realize the focal depth of 1 mm, $$(J_1(2\pi\cdot r_a\cdot((1/\xi_1)+(1/\xi_2))\cdot 6\cdot 1))/(\pi\cdot r_a\cdot((1/\xi_1)+(1/\xi_2))\cdot 6\cdot 1)\geqq 0.1 \tag{11}$$

When expression (11) is solved, $$r_a\cdot((1/\xi_1)+(1/\xi_2))\leqq 0.0908 \tag{12}$$

When the document floating amount is 1.6 mm as disclosed in JP-A-2006-14081, and the design image surface is separated from the document table glass surface by 0.1 mm in accordance with the invention, and when the focal depth is defined by MTF(6)>0.1 (10%), a defocus area of 1.5 mm from the design object surface is used, and the following expression is obtained.

$$(J_1(2\pi\cdot r_a\cdot((1/\xi_1)+(1/\xi_2))\cdot 6\cdot 1.5))/(\pi\cdot r_a\cdot((1/\xi_1)+(1/\xi_2))\cdot 6\cdot 1.5)\geqq 0.1 \tag{13}$$

When expression (13) is solved, $$r_a\cdot((1/\xi_1)+(1/\xi_2))\leqq 0.0604 \tag{14}$$

Hereinafter, as specific design examples, a first to a third examples will be described.

The lens group constituting the lens array of the invention are arranged in hexagonal close packing as shown in FIG. 4, and a distance between lens centers is P, and an aperture radius is $r_a$. Incidentally, the reason why the lens group constituting the lens array is arranged in hexagonal close packing is to maximize the effective lens area per unit area.

FIRST EXAMPLE

A first example will be first described.

It is assumed that P=0.4 mm and $r_a$=0.165 mm are established. FIG. 8 shows the basic arrangement of respective lenses in the first example, and FIG. 9 shows aspheric coefficients of the respective lenses in the first example.

Here, an aspherical expression is represented by an expression shown in FIG. 10.

In the expression shown in FIG. 10, x, y and z denote a local coordinate system of each lens surface, and the directions are as indicated by arrows shown in FIG. 1. In the expression shown in FIG. 10, cv denotes an inverse of RADIUS.

At this time, since $\xi_1$=1.348032947 and $\xi_2$=7.57771392 are established, $$r_a\cdot((1/\xi_1)+(1/\xi_2))=0.144174946\leqq 0.218$$

is established and satisfies expression (8). However, expression (10) is not satisfied.

Figure 11:
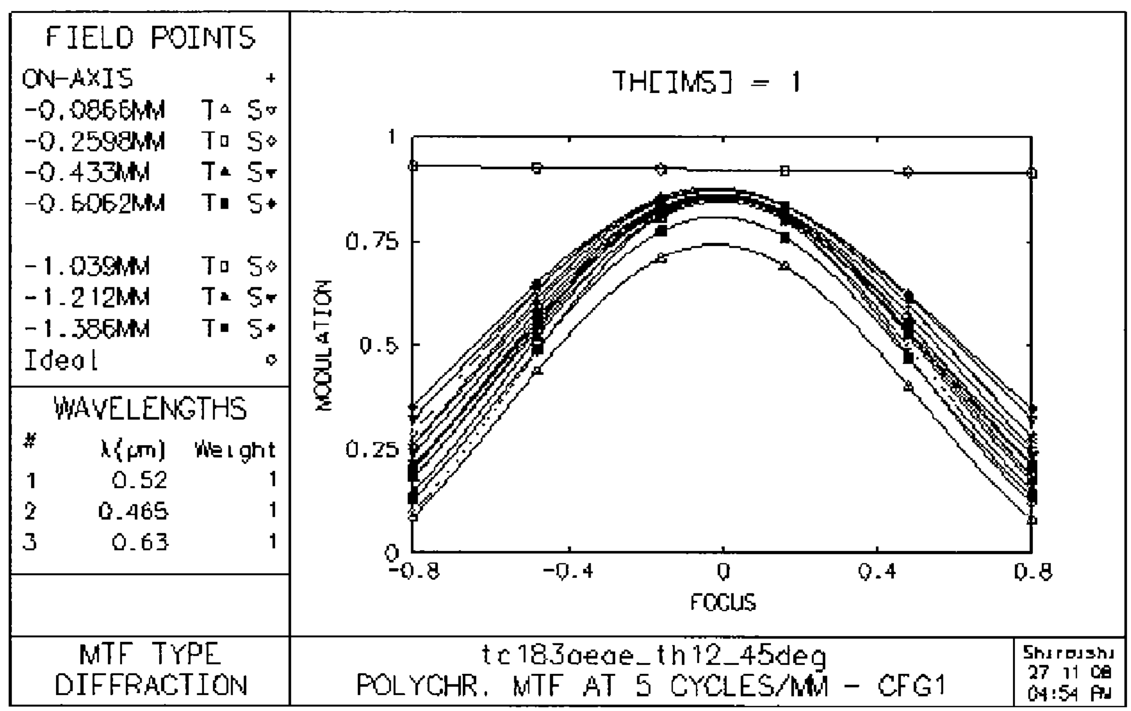
FIG. 11 is a plotted view in which a horizontal axis of a lens array represents a defocus amount, and a vertical axis represents an MTF(5) which is an MTF at 5 cycles/mm.

FIG. 11 is a plotted view in which a horizontal axis of this lens array represents a defocus amount, and a vertical axis represents MTF(5) which is MTF at 5 cycles/mm. It is understood that although MTF(5)≧0.2 (20%) is established when the defocus is 0.45, MTF(5) is lower than 0.2 (20%) when the defocus is 0.8.

Figure 12:
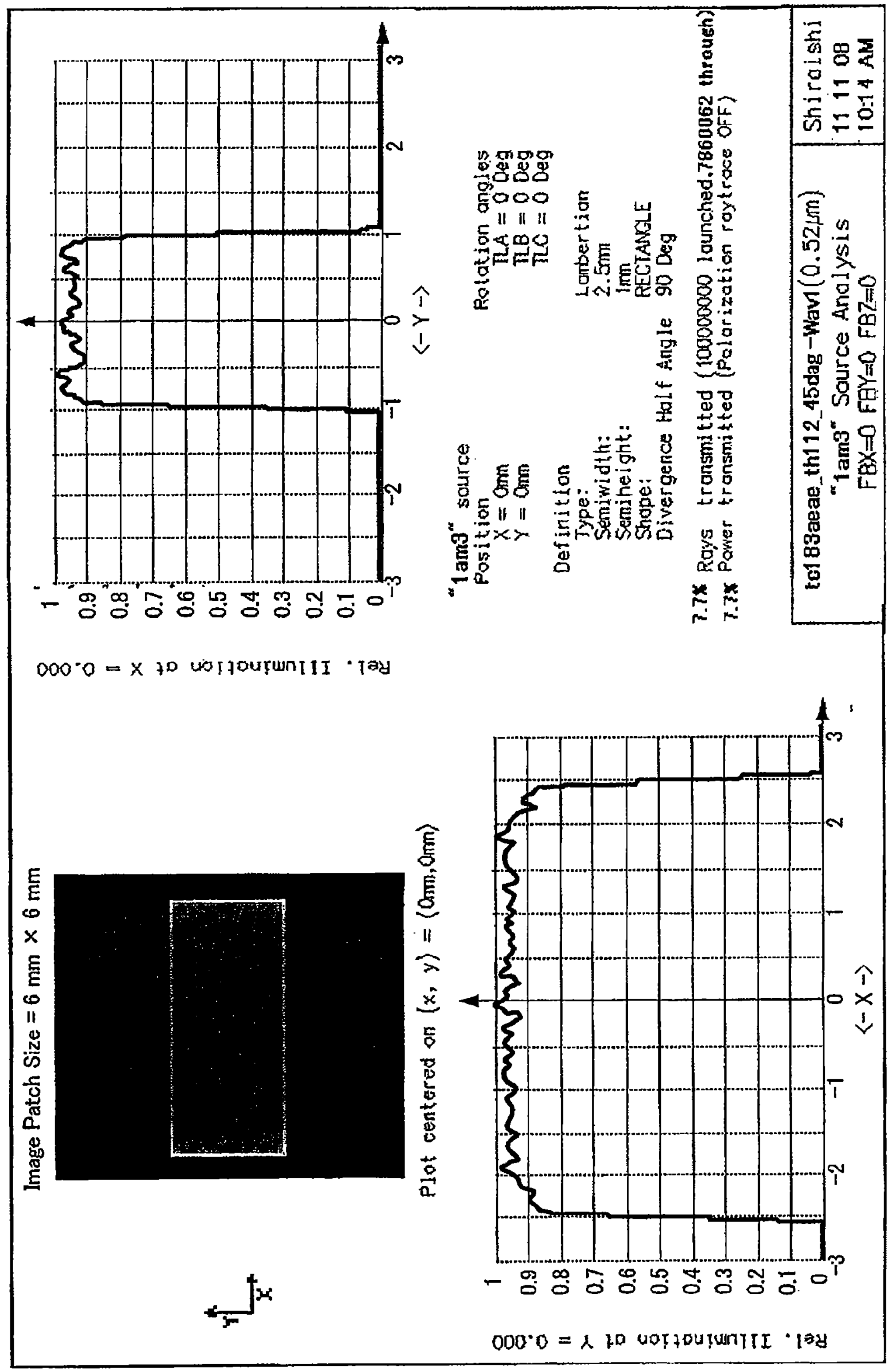
FIG. 12 is a view showing an illumination distribution in the first example.

FIG. 12 shows an illumination distribution. An upper right drawing shows the illumination distribution in a sub-scanning direction (direction of document scan), and a lower left drawing shows the illumination distribution in a main scanning direction. As shown in the drawing, it is understood that according to the structure of the first example, there is no large change in light amount.

SECOND EXAMPLE

Next, a second example will be described.

It is assumed that P=0.4 mm and $r_a$=0.165 mm are established. FIG. 13 shows the basic arrangement of respective lenses of the second example, and FIG. 14 shows aspheric coefficients of the respective lenses in the second example.

At this time, since $\xi_1$=1.950504036 and $\xi_2$=6.76389592 are established, $$r_a\cdot((1/\xi_1)+(1/\xi_2))=0.108987744\leqq 0.123\leqq 0.218$$

is established and satisfies expression (8) and expression (10).

Figure 15:
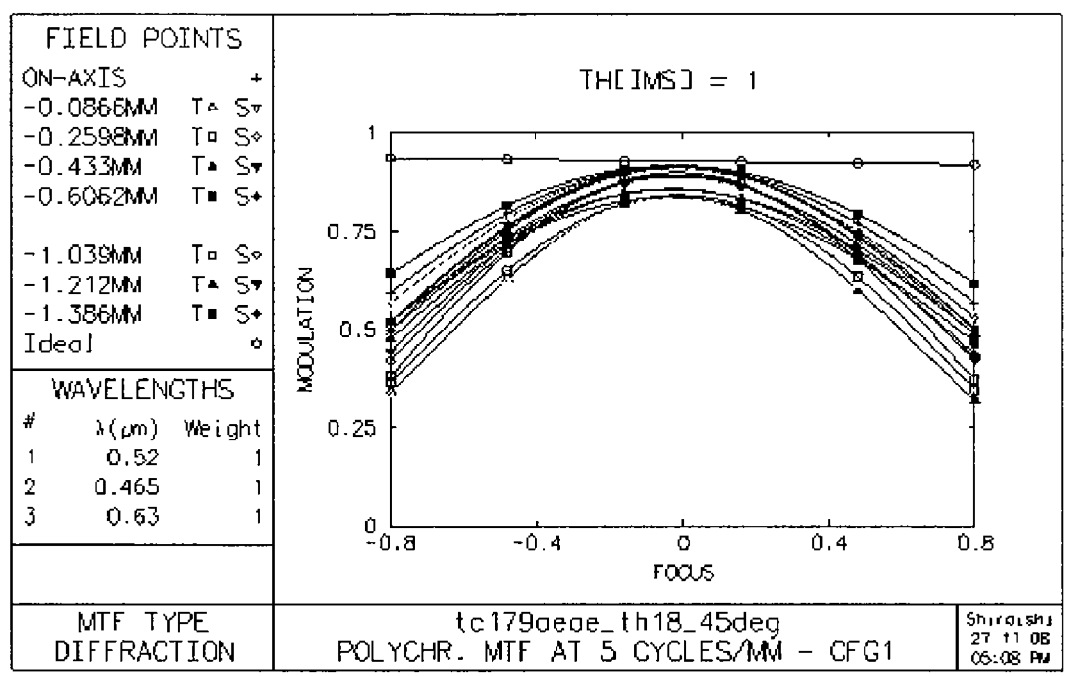
FIG. 15 is a plotted view in which a horizontal axis of a lens array represents a defocus amount, and a vertical axis represents an MTF(5) which is an MTF at 5 cycles/mm.
Figure 16:
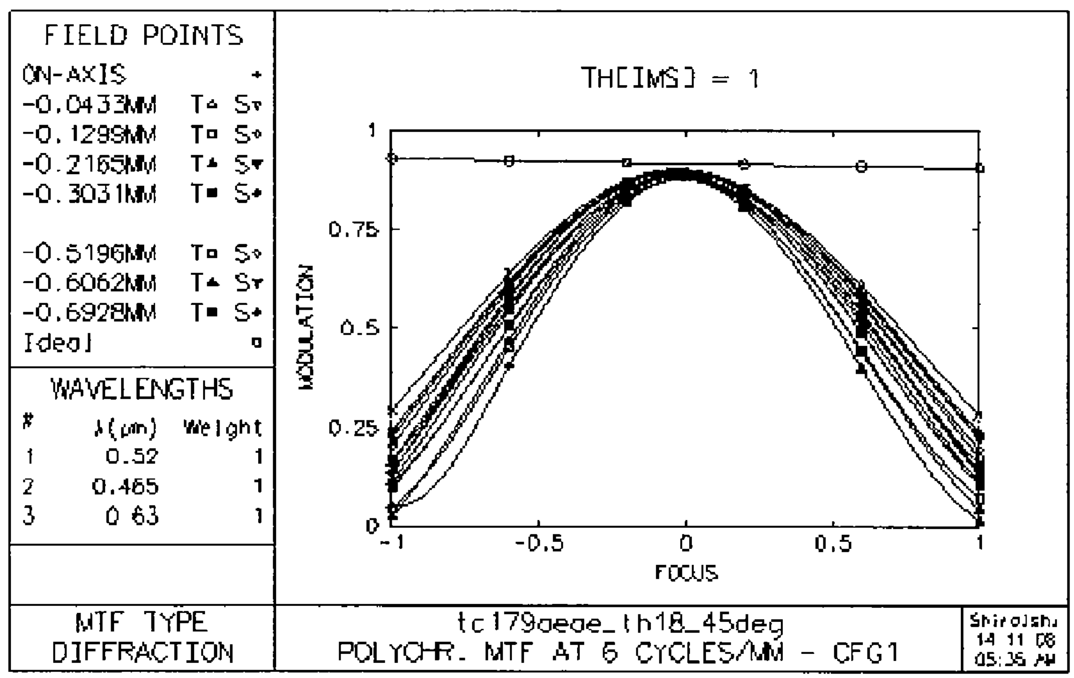
FIG. 16 is a view showing a state in which the value of an MTF(6) is lower than 0.1 (10%) at the defocus ±1 or more.

FIG. 15 is a plotted view in which a horizontal axis of this lens array represents a defocus amount, and a vertical axis represents MTF(5) which is MTF at 5 cycles/mm. It is understood that at defocus of both 0.45 and 0.8, MTF(5) exceeds 0.2 (20%). However, since expression (12) and expression (14) are not satisfied, as shown in FIG. 16, the value of MTF(6) is lower than 0.1 (10%) at defocus of ±1 or more.

Figure 17:
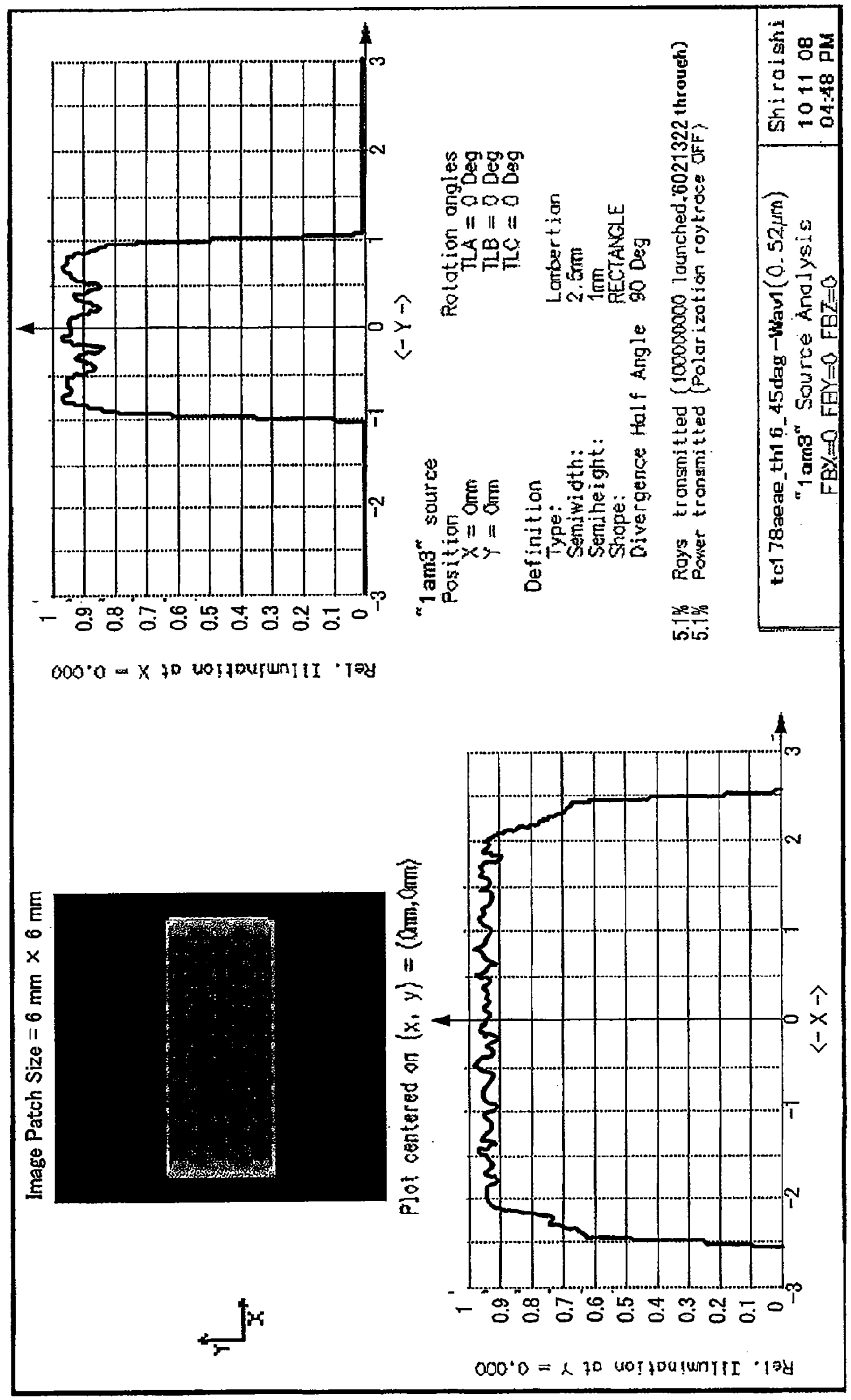
FIG. 17 is a view showing an illumination distribution in the second example.

FIG. 17 shows an illumination distribution. An upper right drawing shows the illumination distribution in a sub-scanning direction (direction of document scan), and a lower left drawing shows the illumination distribution in a main scanning direction. As shown in the drawing, it is understood that according to the structure of the second example, there is no large change in light amount.

THIRD EXAMPLE

Subsequently, a third example will be described.

It is assumed that P=0.2 mm and $r_a$=0.0825 mm are established. FIG. 18 shows the basic arrangement of respective lenses in the third example, and FIG. 19 shows aspheric coefficients of the respective lenses in the third example.

At this time, since $\xi_1$=1.776138422 and $\xi_2$=6.64093292 are established, $$r_a\cdot((1/\xi_1)+(1/\xi_2))=0.058872036\leqq 0.0604\leqq 0.0908\leqq 0.123\leqq 0.218$$

is established, and satisfies expression (8), expression (10), expression (12), and expression (14).

Figure 20:
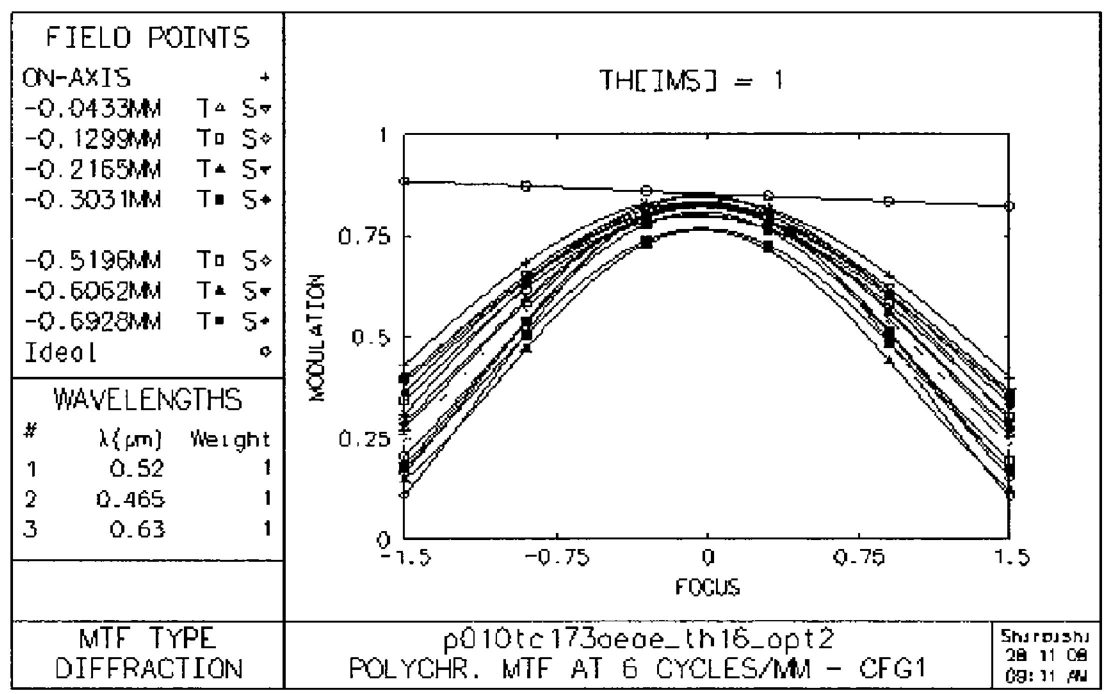
FIG. 20 is a plotted view in which a horizontal axis of a lens array in the third example represents a defocus amount, and a vertical axis represents an MTF(6) which is an MTF at 6 cycles/mm.

FIG. 20 is a plotted view in which a horizontal axis of this lens array represents a defocus amount, and a vertical axis represents MTF(6) which is MTF at 6 cycles/mm. It is understood that MTF(6) exceeds 0.1 (10%) at defocus of both 1 and 1.5.

Figure 21:
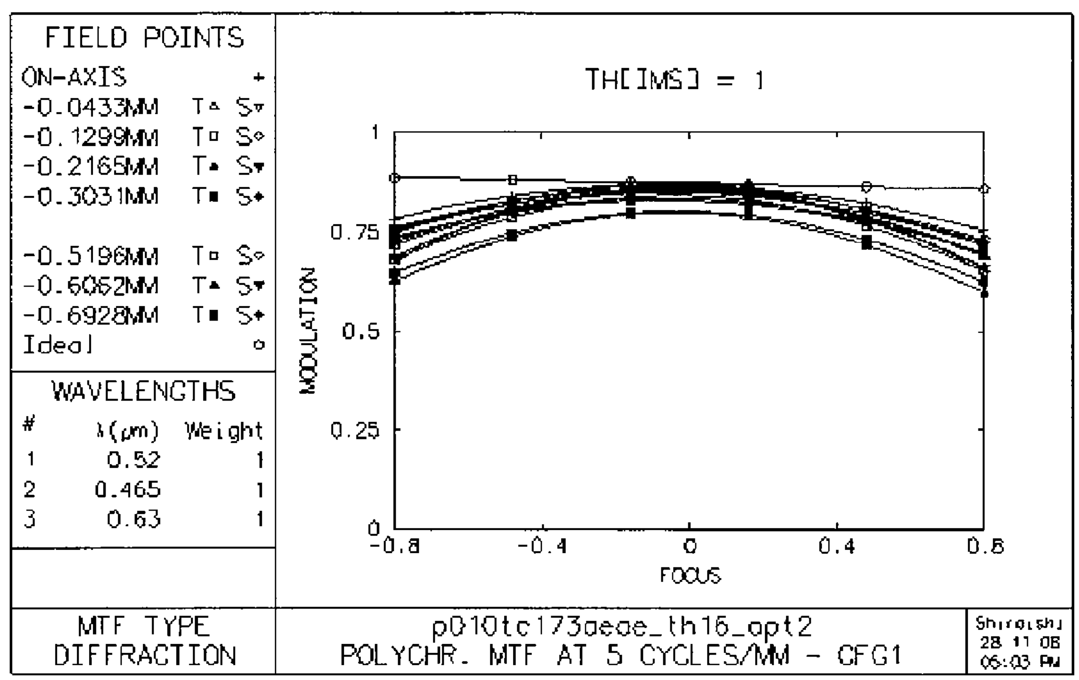
FIG. 21 is a plotted view in which a horizontal axis of a lens array in the third example represents a defocus amount, and a vertical axis represents an MTF(5) which is an MTF at 5 cycles/mm.

FIG. 21 is a plotted view in which a horizontal axis of this lens array represents a defocus amount, and a vertical axis represents MTF(5) which is MTF at 5 cycles/mm. It is understood that MTF(5) exceeds 0.2 (20%) at defocus of both 0.45 and 0.8.

Figure 22:
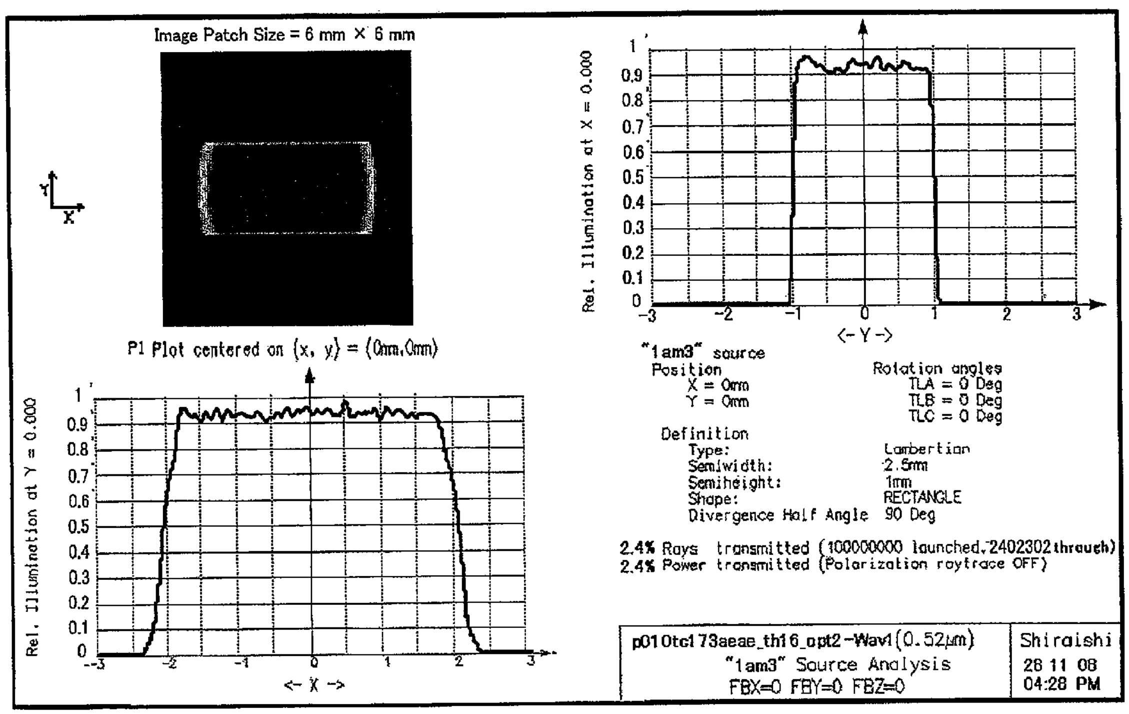
FIG. 22 is a view showing an illumination distribution in the third example.

FIG. 22 shows an illumination distribution. An upper right drawing shows the illumination distribution in a sub-scanning direction (direction of document scan), and a lower left drawing shows the illumination distribution in a main scanning direction. As shown in the drawing, according to the structure of the third example, it is understood that there is no large change in light amount.

MODIFIED EXAMPLE 1

In the foregoing respective examples, although the structure is illustrated in which the incidence surface of the first lens array and the exit surface of the third lens array are plane, no limitation is made to this.

That is, even if the incidence surface of the first lens array and the exit surface of the third lens array have curvatures, the foregoing theoretical expressions can be effectively applied.

Incidentally, when the first surface incidence surface and the third surface exit surface are made to have curvatures, it is necessary to provide a thin aperture plate or an aperture layer also on the first surface incidence surface and the third surface exit surface side.

MODIFIED EXAMPLE 2

Figure 23:
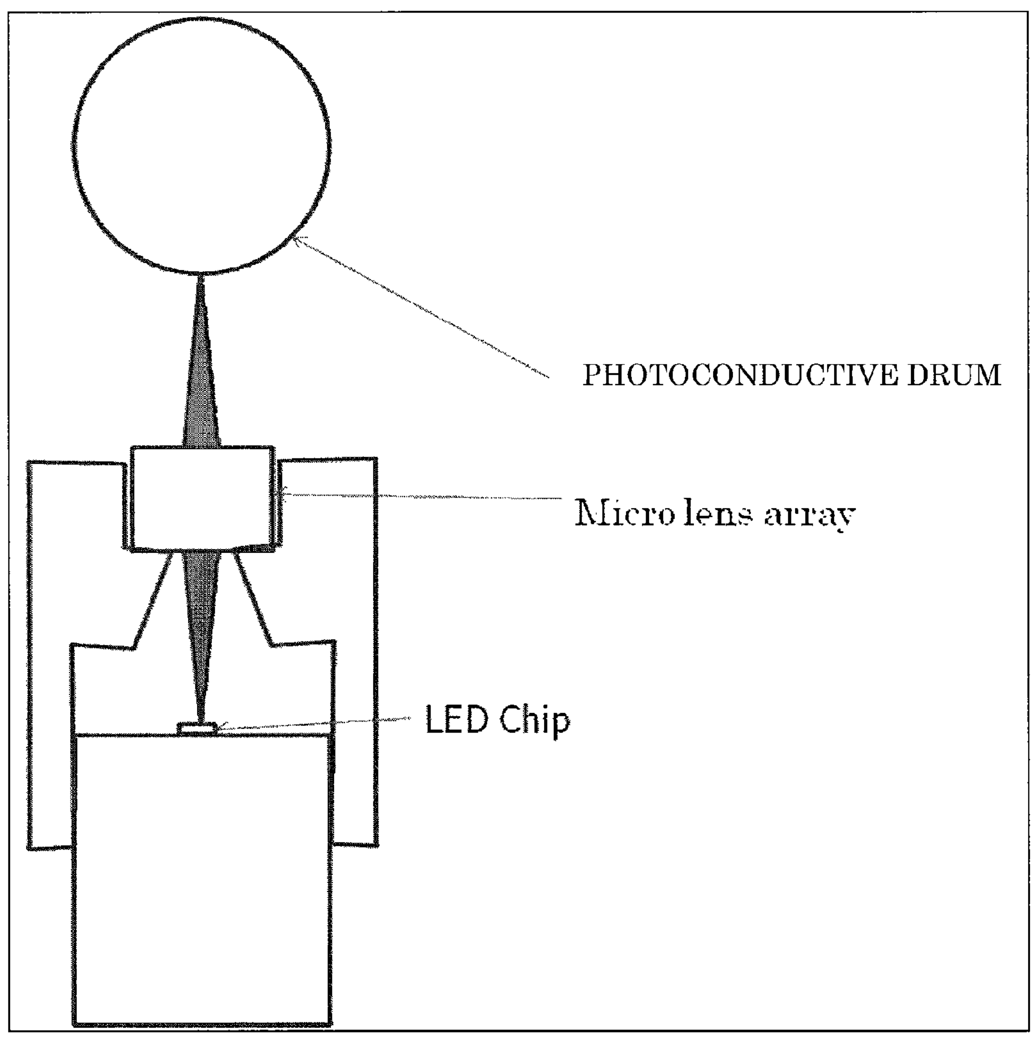
FIG. 23 is a view showing a state where an erect life-size lens array of the invention is applied to a writing optical system.

In the respective examples, although the depth of focal depth is considered on the erect life-size lens array used for the reading optical system, the erect life-size lens array can also be used for a writing optical system as shown in FIG. 23.

When the erect life-size lens array having the foregoing structure is adopted for the writing optical system in an image forming apparatus, the writing optical system can be realized which is not easily influenced by variation in diameter of a photoconductive drum, eccentricity of the photoconductive drum, attachment accuracy of the photoconductive drum and the like.

Besides, in the erect life-size lens array of the embodiment of the invention, it is desirable that the exit surface of the first lens constituting the first lens array and the incidence surface of the third lens constituting the third lens array are formed to be aspherical.

This is because it is difficult for the flat-convex spherical lens to sufficiently correct curvature of field, and as the incident angle of the light beam becomes large, the image formation position approaches the lens side. Further, this is because when the lens shape is made such that the curvature of a portion becomes small as the portion goes away from the optical axis, the curvature of field is sufficiently corrected, and the image formation position can be made to approach the flat plane.

Hereinafter, different points between the invention and the technique disclosed in JP-A-2006-14081 will be described in detail.

JP-A-2006-14081 states on paragraph [0014] that "The erect life-size image-formation system is constructed by overlapping, for example, two or three lens plates vertically, and the center of a minute lens of the upper lens plate is coincident with the center of a minute lens of the lower lens plate. Besides, when the single lens angular aperture of the lens plate is made 4 to 11°, both the transmission light amount and the focal depth can be satisfied. Preferably, the angular aperture is 4 to 6.8°".

In general, "angular aperture" means, in optical design, an angle from an object point on an optical axis of an optical system to a diameter of entrance pupil, or an angle from an image point on an optical axis to a diameter of exit pupil (see Optical Technical Term Dictionary http://www.optronics.co.jp/lex/detail.php?id=1225).

Figure 24:
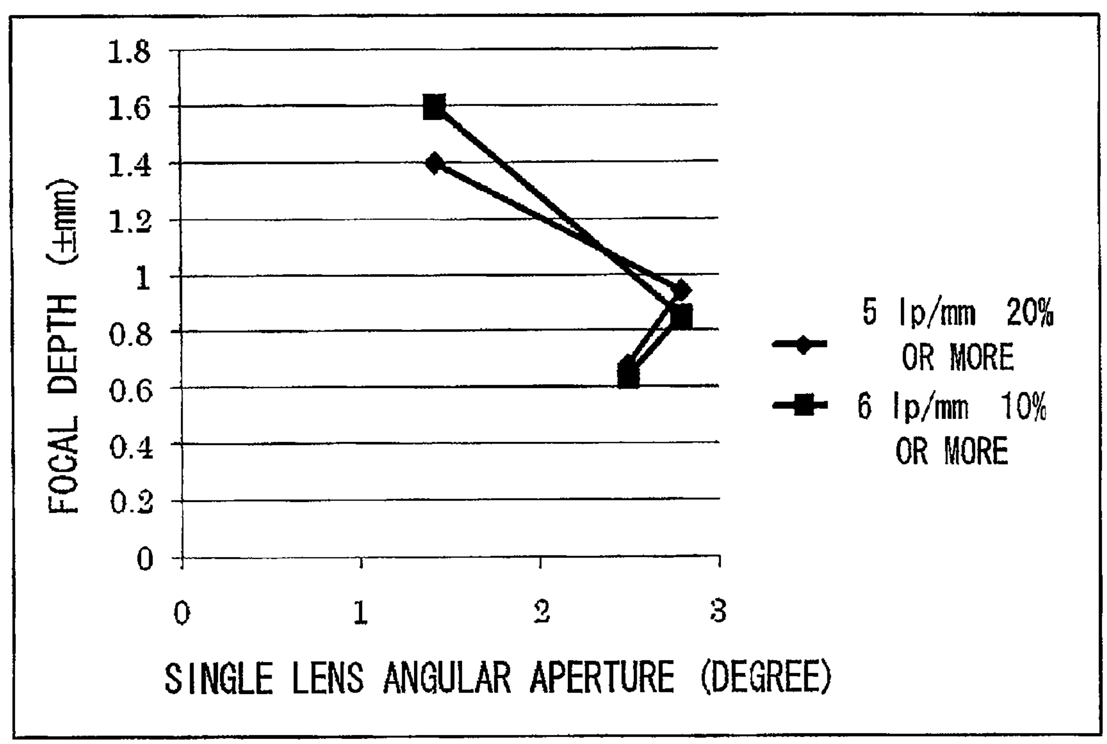
FIG. 24 is view for explaining that in the example of the invention, when plotting is performed while a horizontal axis represents a single lens angular aperture, and a vertical axis represents a focal depth, there is no relation such as monotone decreasing.

However, as shown in FIG. 24, in the embodiment of the invention, when a horizontal axis represents a single lens angular aperture and a vertical axis represents a focal depth, and plotting is performed, it is understood that there is no relation like monotone decreasing.

Figure 25:
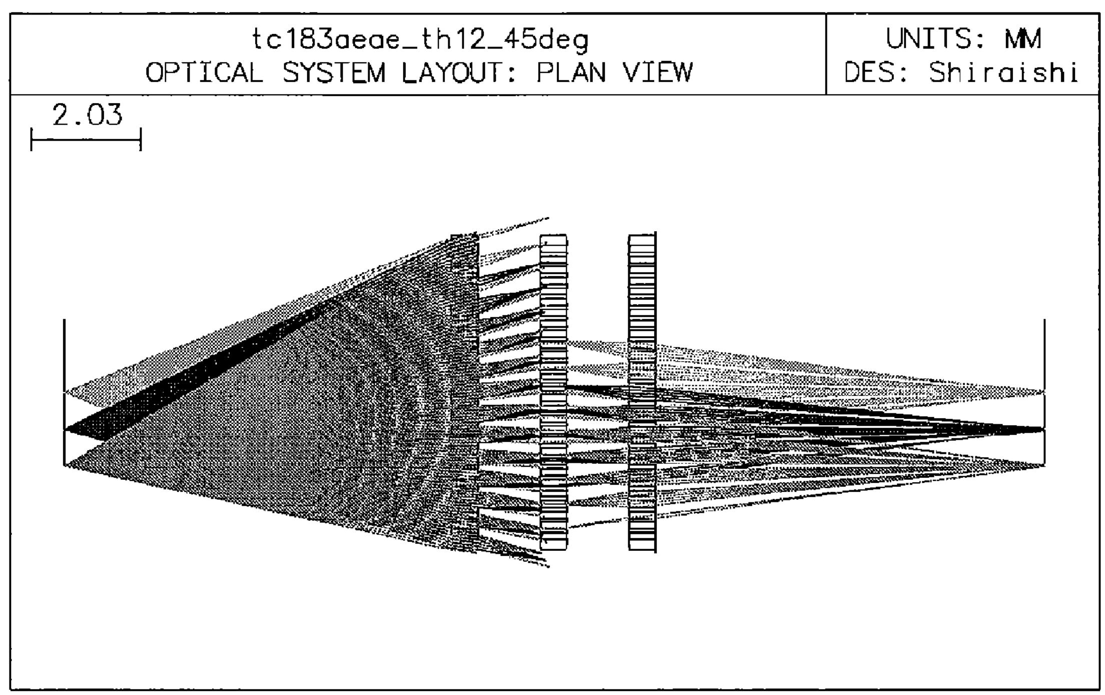
FIG. 25 is a view showing a state where light passing through two or more sets of arrays forms an image on an image surface.
Figure 26:
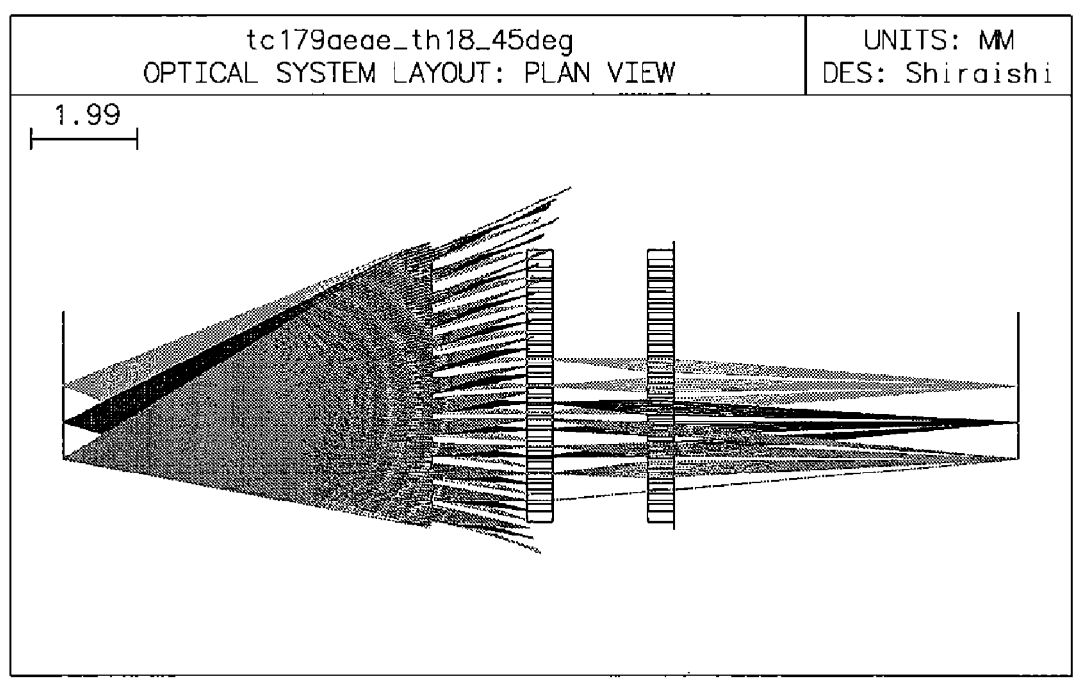
FIG. 26 is a view showing a state where light passing through two or more sets of arrays forms an image on an image surface.
Figure 27:
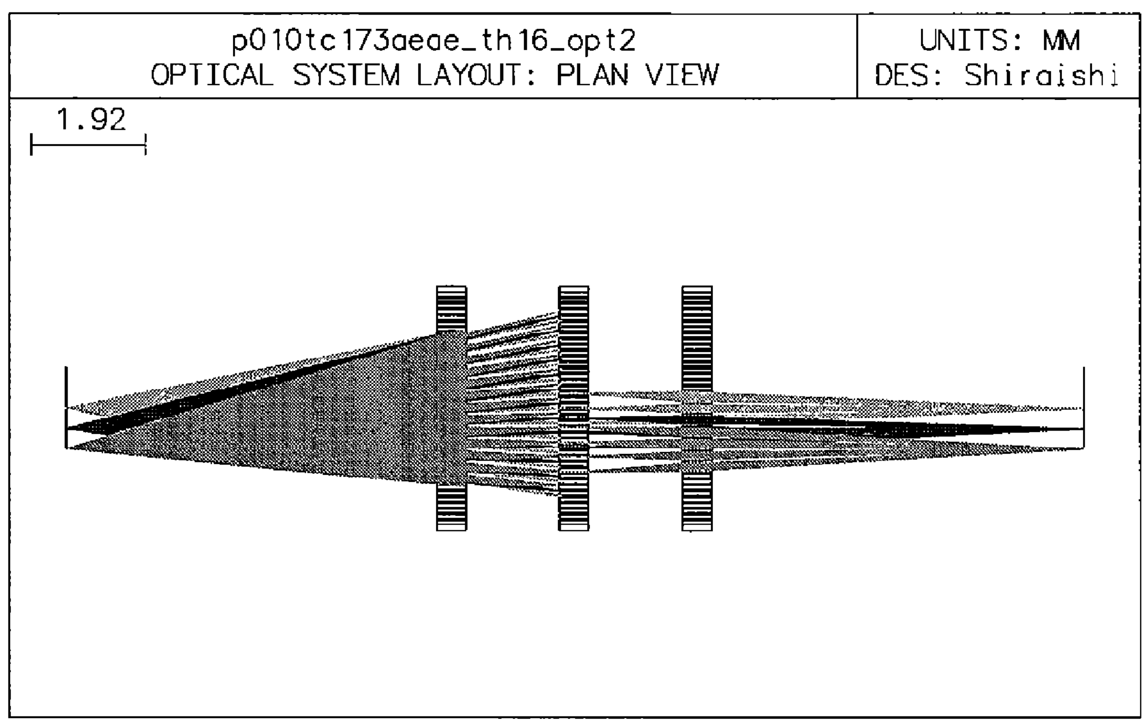
FIG. 27 is a view showing a state where light passing through two or more sets of arrays forms an image on an image surface.

Besides, JP-A-2006-14081 discloses that it is desirable that the single lens angular aperture is 4 to 11°. However, in this embodiment, the single lens angular aperture is 3° or less in all the three examples. With respect to the single lens angular aperture which is disclosed to be desirable in JP-A-2006-14081, the desirable focal depth is not obtained according to other parameters, and the desirable focal depth can be obtained also by another single lens angular aperture. The focal depth is determined by the single lens angular aperture only for a case where a light beam passing through one set of array is dominant. In that case, in order to uniform the light amount between the case where the light beam passes through one set of array and the case where the light beam passes through two sets of array, it is necessary to strictly match the aperture diameters and positions. When the light beam is made to pass through at least two sets of array, even if the aperture diameters and positions are slightly shifted, an increase in light amount unevenness can be reduced. In this embodiment, in all the three examples, as shown in FIG. 25 to FIG. 27, light passing through at least two sets of array forms an image on the image surface.

Figure 28:
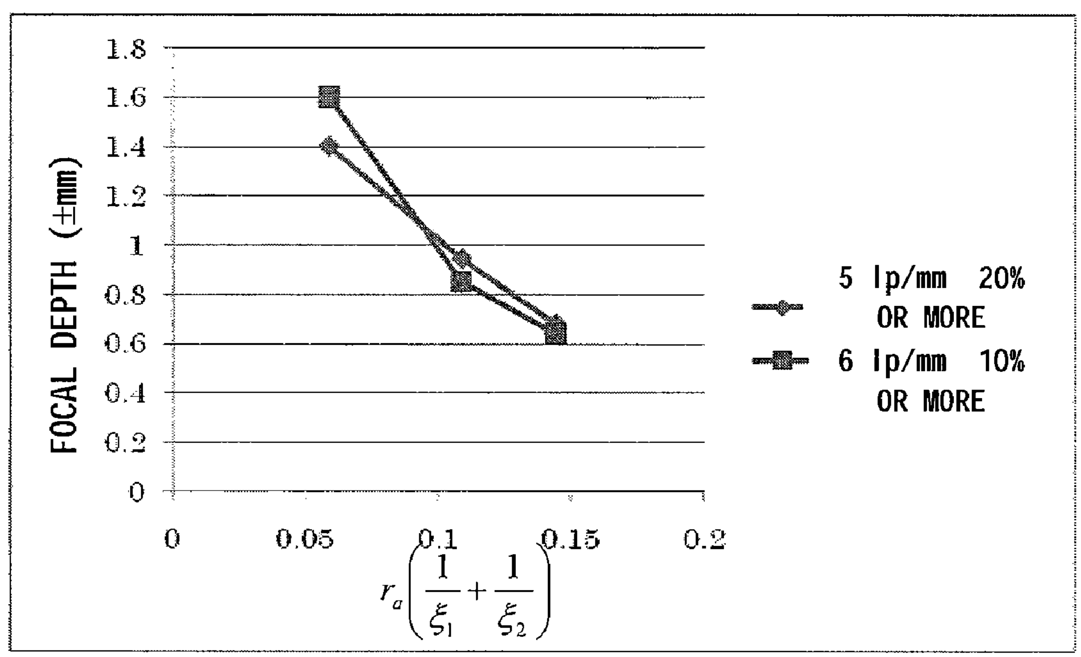
FIG. 28 is a view showing that a focal depth is in a monotone decreasing relation to $r_a \cdot((1/\xi_1)+(1/\xi_2))$.

When FIG. 28 is seen, it is understood that the focal depth is in relation of monotone decreasing to the parameter $r_a\cdot((1/\xi_1)+(1/\xi_2))$.

The present invention can be carried out in various forms without departing from the spirit or the gist thereof. Thus, the foregoing embodiments are merely exemplary in every point, and should not be interpreted restrictively. The scope of the invention is represented by the claims, and is not restricted by the description of the present specification. Further, all modifications, various improvements, alternatives and reformations belonging to the equivalent scope of the claims are within the scope of the invention.

As described above, according to the embodiment of the invention, the erect life-size lens array having a deep focal depth can be realized.

What is claimed is:

1. An erect life-size lens array comprising:

a first lens array in which plural first lenses each having a convex exit surface are arranged in a direction orthogonal to an optical axis;

a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident;

a third lens array in which plural third lenses each having a convex incidence surface are arranged to correspond to the plural first lenses in the direction orthogonal to the optical axis;

a first aperture having plural circular holes formed therein corresponding to the plural first lenses and the plural second lenses and is disposed between the first lens array and the second lens array; and a second aperture having plural circular holes formed therein corresponding to the plural second lenses and the plural third lenses and is disposed between the second lens array and the third lens array, wherein if a distance between a second principal plane of the second lens and a first principal plane of the third lens is $\xi_1$, a distance between a second principal plane of the third lens and a design image surface is $\xi_2$, a radius of the circular hole of the aperture is $r_a$, and a defocus amount is $\xi_3$, the erect life-size lens array is for causing an MTF at a spatial frequency (line-pair/mm) $\nu$ to become $MTF_{target}$ or more and satisfies $$(J_1(2\pi\cdot r_a\cdot((1/\xi_1)+(1/\xi_2))\cdot\nu\cdot\xi_3))/(\pi\cdot r_a\cdot((1/\xi_1)+(1/\xi_2))\cdot\nu\cdot\xi_3)\geqq MTF_{target},$$

where $J_1$ is a first type first-order Bessel function.

2. The lens array of claim 1, wherein the exit surface of the first lens has a power to cause an object surface and a principal point of the second lens on a front side in alight beam traveling direction to become conjugate, and the incidence surface of the third lens has a power to cause a principal point of the second lens on a rear side in the light beam traveling direction and an image surface to become conjugate.

3. The lens array of claim 1, wherein the incidence surface of the first lens and the exit surface of the third lens are plane.

4. The lens array of claim 1, wherein the exit surface of the first lens and the incidence surface of the third lens are aspherical.

5. An erect life-size lens array comprising:

a first lens array in which plural first lenses each having a plane incidence surface and a convex exit surface are arranged in a direction orthogonal to an optical axis;

a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident;

a third lens array in which plural third lenses each having a convex incidence surface and a plane exit surface are arranged to correspond to the plural first lenses in the direction orthogonal to the optical axis;

a first aperture having plural circular holes formed therein corresponding to the plural first lenses and the plural second lenses and is disposed between the first lens array and the second lens array; and a second aperture having plural circular holes formed therein corresponding to the plural second lenses and the plural third lenses and is disposed between the second lens array and the third lens array, wherein if a distance between a second principal plane of the second lens and a first principal plane of the third lens is $\xi_1$, a distance between a second principal plane of the third lens and a design image surface is $\xi_2$, and a radius of the circular hole of the aperture is $r_a$, the erect life-size lens array satisfies $r_a((1/\xi_1)+(1/\xi_2))\leqq 0.218$.

6. The lens array of claim 5, wherein the exit surface of the first lens has a power to cause an object surface and a principal point of the second lens on a front side in a light beam traveling direction to become conjugate, and the incidence surface of the third lens has a power to cause a principal point of the second lens on a rear side in the light beam traveling direction and an image surface to become conjugate.

7. The lens array of claim 5, wherein the incidence surface of the first lens and the exit surface of the third lens are plane.

8. The lens array of claim 5, wherein the exit surface of the first lens and the incidence surface of the third lens are aspherical.

9. An erect life-size lens array comprising:

a first lens array in which plural first lenses each having a plane incidence surface and a convex exit surface are arranged in a direction orthogonal to an optical axis;

a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident;

a third lens array in which plural third lenses each having a convex incidence surface and a plane exit surface are arranged to correspond to the plural first lenses in the direction orthogonal to the optical axis;

a first aperture having plural circular holes formed therein corresponding to the plural first lenses and the plural second lenses and is disposed between the first lens array and the second lens array; and a second aperture having plural circular holes formed therein corresponding to the plural second lenses and the plural third lenses and is disposed between the second lens array and the third lens array, wherein if a distance between a second principal plane of the second lens and a first principal plane of the third lens is $\xi_1$, a distance between a second principal plane of the third lens and a design image surface is $\xi_2$, and a radius of the circular hole of the aperture is $r_a$, the erect life-size lens array satisfies $r_a((1/\xi_1)+(1/\xi_2))\leqq 0.123$.

10. The lens array of claim 9, wherein the exit surface of the first lens has a power to cause an object surface and a principal point of the second lens on a front side in a light beam traveling direction to become conjugate, and the incidence surface of the third lens has a power to cause a principal point of the second lens on a rear side in the light beam traveling direction and an image surface to become conjugate.

11. The lens array of claim 9, wherein the incidence surface of the first lens and the exit surface of the third lens are plane.

12. The lens array of claim 9, wherein the exit surface of the first lens and the incidence surface of the third lens are aspherical.

13. An erect life-size lens array comprising:

a first lens array in which plural first lenses each having a plane incidence surface and a convex exit surface are arranged in a direction orthogonal to an optical axis;

a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident;

a third lens array in which plural third lenses each having a convex incidence surface and a plane exit surface are arranged to correspond to the plural first lenses in the direction orthogonal to the optical axis;

a first aperture having plural circular holes formed therein corresponding to the plural first lenses and the plural second lenses and is disposed between the first lens array and the second lens array; and a second aperture having plural circular holes formed therein corresponding to the plural second lenses and the plural third lenses and is disposed between the second lens array and the third lens array, wherein if a distance between a second principal plane of the second lens and a first principal plane of the third lens is $\xi_1$, a distance between a second principal plane of the third lens and a design image surface is $\xi_2$, and a radius of the circular hole of the aperture is $r_a$, the erect life-size lens array satisfies $r_a((1/\xi_1)+(1/\xi_2))\leqq 0.0908$.

14. The lens array of claim 13, wherein the exit surface of the first lens has a power to cause an object surface and a principal point of the second lens on a front side in a light beam traveling direction to become conjugate, and the incidence surface of the third lens has a power to cause a principal point of the second lens on a rear side in the light beam traveling direction and an image surface to become conjugate.

15. The lens array of claim 13, wherein the incidence surface of the first lens and the exit surface of the third lens are plane.

16. The lens array of claim 13, wherein the exit surface of the first lens and the incidence surface of the third lens are aspherical.

17. An erect life-size lens array comprising:

a first lens array in which plural first lenses each having a plane incidence surface and a convex exit surface are arranged in a direction orthogonal to an optical axis;

a second lens array in which plural second lenses each having a convex incidence surface and a convex exit surface are arranged to correspond to the plural first lenses in the direction orthogonal to the optical axis and on which a light beam emitted from the exit surface of each lens in the first lens array is incident;

a third lens array in which plural third lenses each having a convex incidence surface and a plane exit surface are arranged to correspond to the plural first lenses in the direction orthogonal to the optical axis;

a first aperture having plural circular holes formed therein corresponding to the plural first lenses and the plural second lenses and is disposed between the first lens array and the second lens array; and a second aperture having plural circular holes formed therein corresponding to the plural second lenses and the plural third lenses and is disposed between the second lens array and the third lens array, wherein if a distance between a second principal plane of the second lens and a first principal plane of the third lens is $\xi_1$, a distance between a second principal plane of the third lens and a design image surface is $\xi_2$, and a radius of the circular hole of the aperture is $r_a$, the erect life-size lens array satisfies $r_a((1/\xi_1)+(1/\xi_2))\leqq 0.0604$.

18. The lens array of claim 17, wherein the exit surface of the first lens has a power to cause an object surface and a principal point of the second lens on a front side in a light beam traveling direction to become conjugate, and the incidence surface of the third lens has a power to cause a principal point of the second lens on a rear side in the light beam traveling direction and an image surface to become conjugate.

19. The lens array of claim 17, wherein the incidence surface of the first lens and the exit surface of the third lens are plane.

20. The lens array of claim 17, wherein the exit surface of the first lens and the incidence surface of the third lens are aspherical.

* * * * *